United States Patent
Patten et al.

(10) Patent No.: US 8,132,001 B1
(45) Date of Patent: Mar. 6, 2012

(54) SECURE TELEPHONY SERVICE APPLIANCE

(75) Inventors: Christopher O. Patten, Mission, KS (US); Michael Williams, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1272 days.

(21) Appl. No.: 11/253,890

(22) Filed: Oct. 19, 2005

(51) Int. Cl.
*H04L 29/06* (2006.01)

(52) U.S. Cl. .......... 713/164; 713/155; 713/153; 726/1; 726/7

(58) Field of Classification Search .......... 713/164, 713/155, 153; 709/225, 229; 726/3, 4, 1, 726/7
See application file for complete search history.

(56) References Cited

U.S. PATENT DOCUMENTS

| | | | | |
|---|---|---|---|---|
| 7,716,661 | B2 * | 5/2010 | Paul et al. | 717/173 |
| 2003/0009464 | A1 * | 1/2003 | Campbell et al. | 707/10 |
| 2004/0073654 | A1 * | 4/2004 | Sarma | 709/224 |
| 2006/0230395 | A1 * | 10/2006 | Paul et al. | 717/173 |
| 2007/0121596 | A1 * | 5/2007 | Kurapati et al. | 370/356 |

OTHER PUBLICATIONS

"Reference Manual, LANCOM LCOS 3.50." Aug. 2004. Available at http://www.bauschdatacom.nl/productdata/LANCOM1521IMALCOS3.52.pdf. Downloaded Mar. 11, 2009.*

* cited by examiner

*Primary Examiner* — David García Cervetti

(57) ABSTRACT

Secure telephony service appliances are created from computing devices. The computing devices have restricted access to their hardware and software. The computing devices perform VOP functions to other devices such as phones, modems, and adapters. Security vulnerabilities are reduced by implementing the computing devices as secure appliances for IP telephony.

24 Claims, 4 Drawing Sheets

SECURE TELEPHONY SERVICE APPLIANCE

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

Internet protocol (IP) telephony is a process of commoditization and collapsing of the traditional data and voice networks. Commoditization occurs whereby proprietary systems that traditionally performed the processing and transmission of voice traffic are being replaced with computing devices that are nodes in an IP network. The computing devices use application programming interfaces (APIs) to perform the processing and transmission of voice traffic. Collapsing occurs whereby the proprietary hardware and software that once resided on proprietary network infrastructures are now being replaced by standard implementations, which eliminates the need for separate networks to carry both data and voice traffic. It also eliminates the requirement for separate software development infrastructures for the environments. This process is known as convergence where the processing and transmission of voice and data, and the software development process of both merge into one.

While convergence may mean a significant cost savings, it also opens a whole new area for security vulnerability not experienced before in the voice environment. Devices that previously had a limited amount of intelligence, such as traditional analog telephones are now being replaced by voice over packet (VOP) hardware phones or computing devices running VOP phone software. The VOP hardware phones and the computing devices running VOP phone software are computing devices that support many of the same standard IP services that traditional computing devices support. Along with this increased functionality comes increased security vulnerabilities.

Voice over packet (VOP) is a process for sending voice or video signals over the Internet or other communications networks, such as intranets. If the telephone signal is in analog form (voice or fax), the signal is first converted to a digital form. Packet-routing information is then added to the digital voice signal so the voice signal can be routed through the Internet or other data networks. VOP may include voice over internet protocol (VoIP), voice over asynchronous transfer mode (ATM), voice over frame relay, and VoIP over a wireless local area network (LAN). It may also include other protocols where voice may be transported over the protocol.

In addition to the increased security risks at the phone level, there are additional security risks for the exchanges that operate with the phones since they are also being replaced by computing devices running software that emulates exchange functionality. The trend is a migration towards computing devices or devices that may interact with other devices in a computing environment or network.

With this migration of functionality to commodity equipment or common devices, the security risks become more acute as software developers and others have access to voice elements in IP telephony for malicious purposes. Whereas software developers and others did not have this type of access to voice elements with a public switched telephone network (PSTN), and voice and data was separate, with convergence, both voice and data are exposed to security risks from software developers and others who want to do malicious harm.

In a security sensitive environment where confidentiality, integrity, and non-repudiation of data is important to an organization, standard services such as virtual private network (VPN) and encryption may be employed. However, due to the nature of VOP being both real-time and time sensitive, the standard services may not be able to be employed in the traditional manner. A measure of research may have to be performed in order to provide some modifications to these services in order for them to work properly.

In addition to the issues discussed above, since the voice infrastructure functionality is being emulated from start to finish by computing devices in software, standard IP support servers such as domain name system (DNS), dynamic host configuration protocol (DHCP), trivial file transfer protocol (TFTP), simple network time protocol (SNTP), web services, etc. are being used in IP telephony to process voice calls but are also encountering security risks. The security risks of these IP support servers are well known in the data transmission environment, and with the advent of convergence, all of these security risks will have to be mitigated for the VOP environment. As computing devices, the IP support servers are susceptible to any number of malicious attacks and this could greatly impact a network operating IP telephony.

For the reasons discussed above, it is important to examine the elements of an IP telephony environment to determine the security risks for each element. The IP telephony environment is dependent on IP network services. And while voice and data may coexist in the same network, they are not the same, and some of the data protection techniques used in the past may not work now. Voice has a significant amount of exposure to security risks due to the commoditization of computing devices to perform many of the voice processing functions. It also has a significant amount of exposure to security risks from being connected to an open network like the Internet. With the public switched telephone network (PSTN), the problems encountered now did not exist or existed minimally. The PSTN was and still is a proprietary or limited-access network.

A solution is needed that may evaluate the problems discussed above and make the computing devices more secure for IP telephony. The computing devices would become secure appliances in that they would perform their functions with a restricted and controlled access to their hardware and software. The idea is to isolate these computing devices associated with voice processing to reduce or mitigate security risks.

SUMMARY OF THE INVENTION

This disclosure describes, among other things, systems and a computer-readable medium for implementing a secure appliance for IP telephony.

In accordance with the present invention, a computer system having a processor and a memory to execute a method for implementing a secure appliance for IP telephony is provided that includes providing an operating system with a restricted access. The operating system is embedded in the processor. A set of services is implemented in the appliance in an embedded platform. A set of security mitigation features is applied to the set of services. A modification in the appliance is performed to the operating system or the set of services through secure interfaces. The set of services is provided to a set of registered devices.

In another aspect, computer-readable media having computer-readable instructions embodied thereon for causing a computing device to perform a method for implementing a secure appliance for IP telephony is provided that includes providing an operating system with a restricted access. The operating system is embedded in a processor. A set of services is implemented in the appliance in an embedded platform. A set of security mitigation features is applied to the set of services. A modification in the appliance is performed to the operating system or the set of services through secure interfaces. The set of services is provided to a set of registered devices.

In yet another aspect, a system for implementing a secure appliance for IP telephony is provided that includes an appliance operating in a packet network associated with IP telephony. The appliance provides an operating system with a restricted access. The operating system is embedded in a processor. The appliance implements a set of services in an embedded platform in the appliance. A set of security mitigation features is applied to the set of services. The appliance receives a modification to the operating system or the set of services through secure interfaces. The appliance provides the set of services to a set of registered devices.

In yet another aspect, a system for implementing a secure network for IP telephony services is provided that includes computing devices operating in a packet network associated with a voice over packet (VOP) call. The computing devices operate to communicate with each other or to communicate with a set of registered devices. The computing devices provide an operating system with a restricted access. The operating system is embedded in a processor. The computing devices implement a set of services in an embedded platform. A set of security mitigation features is applied to the set of services. The computing devices receive a modification to the operating system or the set of services through secure interfaces. The computing devices provide the set of services to the set of registered devices.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1:
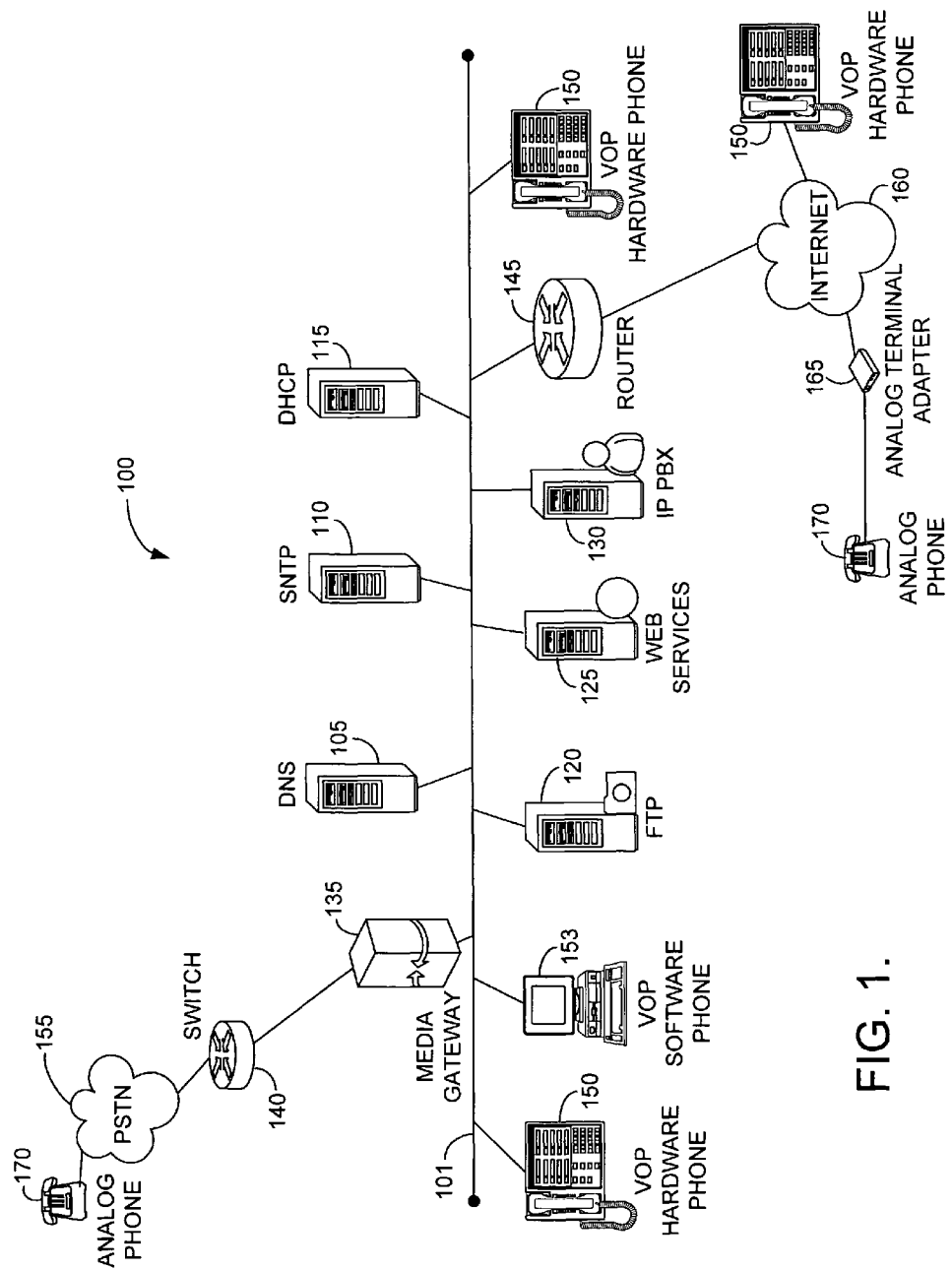
FIG. 1 is a block diagram of an exemplary operating network suitable for practicing an embodiment of the present invention.

The present invention will be better understood from the detailed description provided below and from the accompanying drawings of various embodiments of the invention, which describe, for example, systems and a computer-readable medium for providing secure internet protocol (IP) telephony service appliances. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Secure IP Telephony Service

A secure environment is desired for IP telephony service although IP telephony operates in conjunction with or as part of the Internet. An assessment may be performed to provide an idea of the components involved to create the desired secure environment. Various components provide a variety of services to make IP telephony service work. Some of those components may be combined into several platforms or they may operate with their individual functions. Regardless of their configuration, the components are susceptible to security vulnerabilities which may be assessed by doing the following: Identifying network components to be assessed; determining an operating environment for each component like the operating system or firmware; insuring component is in compliance with industry or organizational standards for best practices in security mitigation; and tracking the applications (services) operating on the components to determine their security risks to the network.

An assessment and an operation of the above-mentioned components may be combined into one scheme to implement an embodiment of the present invention. Also, the assessment may be decoupled from the operation of the components. In either case, embodiments of the present invention may be implemented as shall be described below.

In FIG. 1, a block diagram of an operating network 100 is shown with various components. The block diagram may be divided into three groups. In a first group, an IP telephony network 101, a DNS 105, a SNTP 110, a DHCP 115, a TFTP 120, a web services 125, an IP PBX 130, a media gateway 135, a VOP phone 150, and a softphone 153 are shown operating together. In a second group, a switch 140, a PSTN 155, and an analog phone 170 are shown operating together with a connection between switch 140 and media gateway 135. In a third group, a router 145, VOP phone 150, an Internet 160, an adapter 165, and analog phone 170 are shown operating together with a connection between router 145 and IP telephony network 101.

A majority of the detailed discussion of FIG. 1 shall involve the first group. Additional discussion may include the second and third groups with regards to their relationship to the first group. The second and third groups are shown to provide an expansive view of an exemplary operating network.

In FIG. 1, various computing devices operate to provide IP telephony. Those computing devices may be implemented as secure appliances to operate in IP telephony network 101 to create a secure environment. Secure appliances, in this context, are computing devices that restrict or control access to their hardware and software. The computing devices may have their operating system restricted in such a way as to reduce security vulnerabilities. The operating system may be embedded into the hardware of the computing device to secure it from vulnerabilities such as computer viruses. The operating system may be embedded in the computing device's electrically erasable programmable read-only memory (EEPROM).

In addition to the attributes above, the computing devices may have secure interfaces to control the flow of information to and from the computing devices. For example, a computing device may need an update to the computing software from time to time. In order to update the computing software, an administrator may access the computing device over a secure channel and perform the update or modification to the computing device. Because the computing device is functioning as a secure appliance, the administrator may use security measures to access the computing device as well as implement special procedures to perform the update or modification. As an example, encryption techniques may be used so that security vulnerabilities may be reduced. The secure interface may be restricted to an offline procedure with a direct connection to the computing device. Or, the connection may be accomplished over the Internet using various encryption techniques with other security measures. In addition to the discussion above, a similar method may be used to update or modify the applications operating on the computing device. The applications operate as a set of services that may be updated or modified on a periodic basis.

As a security appliance, the physical access to the computing device may be restricted or not exist except for entry points used by the secure interface. The computing device may be implemented without a hard drive, external storage, CDROM, or floppy disk. The idea is to provide the computing device as a self-contained environment with reduced physical access to reduce a possibility of tampering with the computing device. If the computing device does not contain a hard drive, external storage, CDROM, floppy disk, or other physical device attached to it, then a reduction in security vulnerability from a physical standpoint may be achieved. For example, computing software may not be manipulated if there is no hard drive and also cannot be loaded into the computing device's memory if there is no hard drive. However, the computing software may be embedded into the computing device's EEPROM which may be accessed in a controlled manner by the administrator. Access to the computing software is restricted and may not be accessed as in the case of most computing devices.

The computing device may implement security mitigation features on a periodic basis to prevent or remove security vulnerabilities such as computer viruses. One of those features may suggest that the administrator implement an organization's security best practice. Another may suggest that the administrator implement security policies based on an industry standard for the computing device. In either case, the security best practice or security policies may be implemented as an embodiment of the present invention to mitigate security vulnerabilities.

When operating as security appliances, the computing devices may perform various functions. The functions may vary across the computing devices, or different functions may be found operating in one computing device. The functions relate to providing IP telephony and may include DNS functions, SNTP functions, DHCP functions, TFTP functions, web services functions, media gateway functions, or IP PBX functions. These functions may include other functions not listed here but capable of operating in the computing devices. An implementer may provide the functions or a subset of them as desired in implementing embodiments of the present invention.

In FIG. 1, the secure appliance operating with DNS functions is shown as DNS 105. The secure appliance operating with SNTP functions is shown as SNTP 110. The secure appliance operating with DHCP functions is shown as DHCP 115. The secure appliance operating with TFTP functions is shown as TFTP 120. The secure appliance operating with web services functions is shown as web services 125. The secure appliance operating as an IP PBX is IP PBX 130. The secure appliance operating as a media gateway is media gateway 135.

As one of ordinary skill art may see, if the computing devices are secure, a concern may shift to other devices operating in IP telephony network 101 such as phones. An embodiment of the present invention may be implemented such that VOP phone 150 and softphone 153 may operate through a registry. The registry may contain a list of registered devices that may interact together. For example, the administrator may create in a secure environment a list of registered devices including the phones, terminal adapters, and the computing devices. The list may be used to identify the devices that may communicate together in a restricted environment. For example, if a VOP phone is added to IP telephony network 101 without registering the VOP phone, the computing devices may not recognize the VOP phone to provide it with service. Therefore, DNS 105 may not provide service to the phone. Likewise, if a new computing device is added to IP telephony network 101 without registering, the registered devices may not recognize the new computing device. One way to register a new device for IP telephony network 101 may be to have the list pushed or downloaded to the existing computing devices through a set of updates or modifications. The updates or modifications may occur manually or automatically depending on the implementation of the embodiment of the present invention.

By securing the devices that operate in IP telephony network 101, security vulnerabilities may be reduced. However, connections may be maintained with other networks through such devices as switch 140 and router 145. Switch 140 and router 145 represent connections to the second and third groups discussed above. A phone call over a packet network may need to terminate in PSTN 155. It is assumed that if IP telephony 101 is secure, switch 140 and PSTN 155 may be secure by virtue of their proprietary nature. For a call terminating in Internet 160 like adapter 165 and analog phone 170, it is assumed that by implementing embodiments of the present invention, these devices may become secure by communicating with secure appliances and communicating only with the registered devices. For example, VOP phone 150 connected to Internet 160 may be vulnerable to malicious activities that may occur in the packet network including susceptibility to computer viruses. However, VOP phone 150 may have a reduced vulnerability in that it communicates with secure appliances and only to those secure appliances that are registered devices, as created by the administrator for the IP telephony network.

Figure 2:
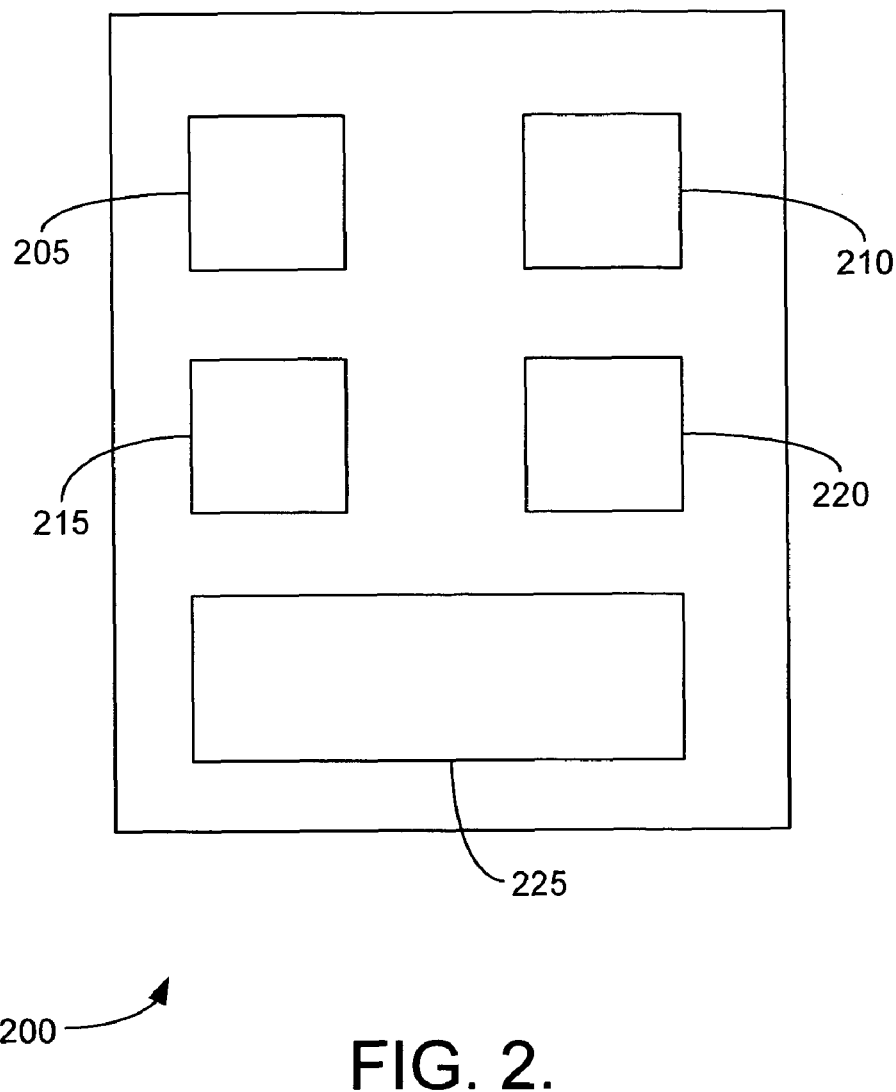
FIG. 2 is a block diagram of an exemplary security appliance suitable for practicing an embodiment of the present invention.

Turning now to FIG. 2, a block diagram of various attributes of a security appliance are shown in a computing device 200. Computing device 200 may include an operating system 205, a set of services 210, a set of security mitigation features 215, a secure interface 220, and a restricted access 225. By implementing the attributes listed above or a subset of them, computing device 200 may become a secure appliance. As discussed in FIG. 1, operating system 205 may operate on computing device 200 in a restricted environment. In FIG. 1, it was shown in an example that operating system 205 may be embedded into the EEPROM rather than stored on a hard disk or external storage. The set of services 210 may be embedded into the EEPROM as well. Services 210 may include the list of functions (discussed above for DNS, SNTP, DHCP, TFTP, web services, IP PBX, and media gateway) provided to the registered devices such as VOP phone 150, adapter 165, and modems. Security mitigation features 215 include the security best practices or security policies that may be implemented on computing device 200. Secure interface 220 may be a secure or encrypted connection to allow for a transfer of information to and from computing device 200. Secure interface 220 may be controlled by the administrator or other authorized personnel. Restricted access 225 relates to the physical attributes of the secure appliance. Restricted access 225 illustrates that computing device 200 has no hard drive, no external storage, no CDROM, and no floppy disk to reduce security vulnerabilities. Restricted access 225 may relate to additional restrictions or a subset of the ones listed above in implementing other embodiments of the present invention.

Figure 3:
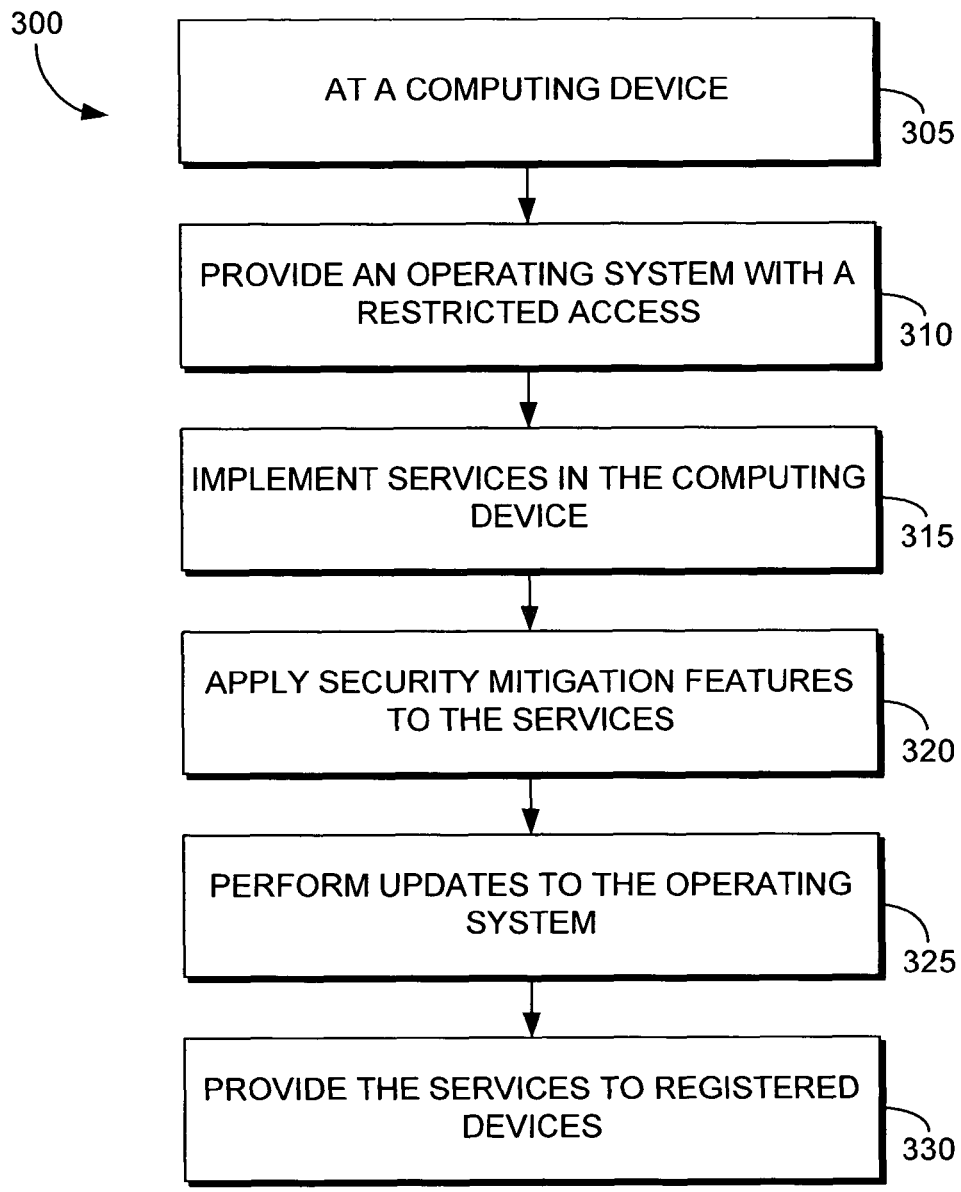
FIG. 3 is a flowchart of an exemplary process for implementing a secure appliance in an embodiment of the present invention.

In FIG. 3, a process for implementing a secure appliance is shown in a method 300. Method 300 illustrates a secure appliance created from a computing device such as computing device 200. The computing device may include computers, servers, workstation or other devices capable of being connected to Internet 160. Method 300 takes the computing device in a step 305 and provides an operating system, operating system 205, with a restricted access in a step 310. The operating system may come from a commercial vendor like the brands of the WINDOWS Operating System of the Microsoft Corporation of Redmond, Wash. and the MACINTOSH OPERATING SYSTEM and the MACINTOSH OPERATING SYSTEM X of the Apple Corporation of Cupertino, Calif. The operating systems may be specially tailored to execute on computing device 200. In addition, the operating system may be embedded in the hardware of computing device 200 in the EEPROM as discussed in FIG. 2.

In a step 315, computer software applications in the form of services are implemented in computing device 200. As discussed above, the services correspond to various functions that occur when providing IP telephony in the packet network and may vary among the different computing devices operating in IP telephony network 101. In a step 320, security mitigation features are applied to the services as discussed in FIG. 2. Computer software updates or modifications to the operating system or the services may occur in a step 325. As discussed above in FIG. 2, the updates or modifications may occur over a secure connection. In addition, the updates or modifications may include information pertaining to the list of registered devices capable of communicating in IP telephony network 101. As long as the registered devices are identified, computing device 200 may provide the services to the registered devices as shown in a step 330. The services correspond to the list of functions discussed in FIG. 1.

Figure 4:
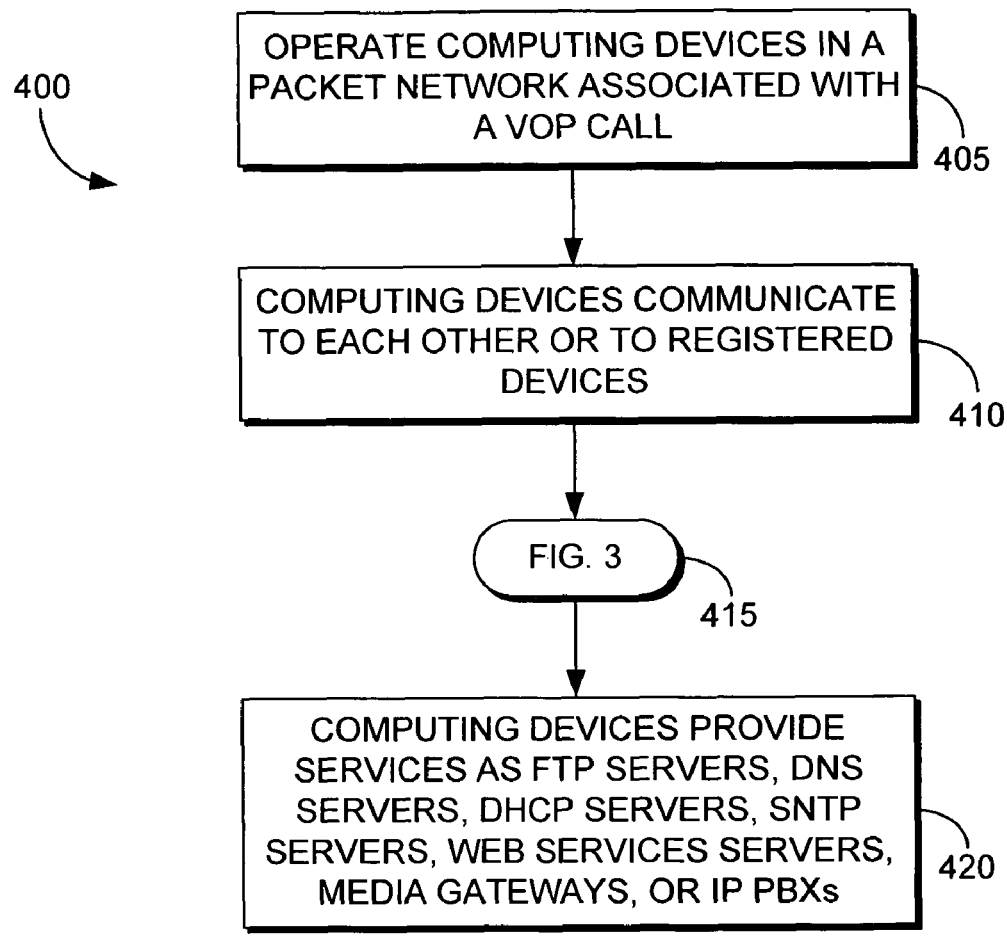
FIG. 4 is a flowchart of an exemplary process for implementing secure appliances in a packet network in an embodiment of the present invention.

In FIG. 4, it is possible to have several computing devices operating in IP telephony network 101 that may become secure appliances. The computing devices may have different functions to provide to the registered devices. The computing devices may implement variations of the attributes discussed in FIGS. 1, 2, and 3 in becoming secure appliances. FIG. 4 illustrates a process for implementing secure appliances in a packet network in a method 400. Method 400 may have several computing devices operating in the packet network associated with a VOP call in a step 405. The computing devices may be the same as computing device 200 or a variation thereof. The computing devices communicate with each other and to the registered devices in a step 410 to provide IP telephony service. As discussed above, the registered devices may be VOP phone 150, adapter 165, or a modem. Adapter 165 may include analog terminal adapters to allow connections to analog phones such as analog phone 170 in FIG. 1.

In a step 415, method 300 is executed for the computing devices. In a step 420, the computing devices provide services to the registered phones, adapters, and modems. The services include TFTP, DNS, DHCP, SNTP, web services, media gateways, and IP PBXs. As discussed above, embodiments of the present invention may be implemented with the computing devices performing all of the service or a subset thereof. Furthermore, different computing devices may perform different services and the different computing devices may communicate with each other.

The prior discussion is only for illustrative purposes to convey exemplary embodiments. The steps discussed in FIGS. 3 and 4 may be executed without regards to order. Some steps may be omitted and some steps may be executed at a different time than shown. For example, step 325 may be executed before step 320. Step 420 may be executed before step 415. The point here is to convey that the figures are merely exemplary for the embodiments of the present invention and that other embodiments may be implemented for the present invention.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer system having a processor and a memory, the computer system operable to execute a method for implementing a secure appliance for IP telephony, the method comprising:

providing an operating system with a restricted access in the appliance wherein the operating system is embedded in an erasable programmable read-only memory in the processor of the appliance;

implementing a set of services in the appliance in the erasable programmable read-only memory in an embedded platform, wherein the set of services is applications that perform the functions of the appliance, wherein a set of security mitigation features in the appliance is applied to the set of services, and wherein the set of security mitigation features include security policies that are applied to the set of services in the appliance;

performing a modification in the appliance to at least one of the operating system and the set of services through one or more secure interfaces wherein performing the modification comprises implementing an encryption technique during a software change between a source of the software change and the appliance and performing the software change in the appliance; and providing the set of services from the appliance to a set of registered devices wherein the set of registered devices is a registry of devices created by an administrator and the registry identifies devices that can interact together in a secure environment, wherein the appliance only communicates with the set of registered devices and wherein the appliance does not include a hard drive, an external storage, a CDROM device, nor a floppy disk device.

2. The system of claim 1, further comprising receiving at the appliance a set of information associated with a list of registered devices that are allowed to interact with the appliance.

3. The system of claim 2, wherein the set of information comprises a master list of the registered devices allowed to communicate with the appliance, wherein the master list is created in a secure environment and periodically sent to the appliance to identify the registered devices that are allowed to interact with the appliance.

4. The system of claim 2, wherein the registered device is selected from the group including a VOP telephone, a modem, and a telephone adapter.

5. The system of claim 4, wherein the appliance is a trivial file transfer protocol (TFTP) server, wherein the TFTP server provides a repository and performs a download of the information to the registered devices.

6. The system of claim 4, wherein the appliance is a trivial file transfer protocol (TFTP) appliance dedicated to securing the registered devices.

7. The system of claim 4, wherein the appliance is a domain name system (DNS) server wherein the DNS server provides IP address mapping.

8. The system of claim 4, wherein the appliance is a dynamic host configuration protocol (DHCP) server wherein the DHCP server dynamically assigns IP addresses to the registered devices.

9. The system of claim 4, wherein the appliance is a simple network time protocol (SNTP) server wherein the SNTP server provides time keeping.

10. The system of claim 4, wherein the appliance is a web services server wherein the web services server delivers content to one or more registered devices.

11. The system of claim 4, wherein the appliance is an IP PBX.

12. The system of claim 4, wherein the appliance is a media gateway.

13. The system of claim 4, wherein the appliance is one or more computing devices operating in a packet network associated with IP telephony.

14. One or more non-transitory computer-readable media having computer-readable instructions embodied thereon, wherein all steps are performed by at least one computing device, for causing a computing device to perform a method for implementing a secure appliance for IF telephony, comprising:

providing an operating system with a restricted access in the appliance wherein the operating system is embedded in an erasable programmable read-only memory in a processor in the appliance;

implementing a set of services in the appliance in the erasable programmable read-only memory in an embedded platform, wherein the set of services is applications that perform the functions of the appliance, wherein a set of security mitigation features in the appliance is applied to the set of services, and wherein the set of security mitigation features include security policies that are applied to the set of services in the appliance;

performing a modification in the appliance to at least one of the operating system and the set of services through one or more secure interfaces wherein performing the modification comprises implementing an encryption technique during a software change between a source of the software change and the appliance and performing the software change in the appliance; and providing the set of services from the appliance to a set of registered devices wherein the set of registered devices is a registry of devices created by an administrator and the registry identifies devices that can interact together in a secure environment, wherein the appliance only communicates with the set of registered devices and wherein the appliance does not include a hard drive, an external storage, a CDROM device, nor a floppy disk device.

15. The media of claim 14, further comprising receiving an indication of registered devices that are allowed to interact with the appliance.

16. The media of claim 15, wherein the indication comprises a master list of the registered devices allowed to communicate with the appliance, wherein the master list is created in a secure environment and periodically sent to the appliance to identify the registered devices that are allowed to interact with the appliance.

17. The media of claim 15, wherein the registered devices are selected from the group including VOP telephones, modems, and telephone adapters.

18. The media of claim 17, wherein the appliance is at least one of:

a trivial file transfer protocol (TFTP) server wherein the TFTP server provides a repository of information and performs a download of the information to the registered devices;

a trivial file transfer protocol (TFTP) appliance dedicated to securing the registered devices;

a domain name system (DNS) server wherein the DNS server provides IP address mapping;

a dynamic host configuration protocol (DHCP) server wherein the DHCP server dynamically assigns IP addresses to the registered devices;

a simple network time protocol (SNTP) server wherein the SNTP server provides time keeping;

a web services server that delivers content to one or more registered devices an IP PBX; and a media gateway.

19. The media of claim 17, wherein the appliance is one or more computing devices operating in a packet network associated with IP telephony.

20. A system for implementing a secure appliance for IP telephony, comprising:
- an appliance operating in a packet network associated with IP telephony; and
- the appliance operable:
  - to provide an operating system with a restricted access wherein the operating system is embedded in an erasable programmable read-only memory in a processor,
  - to implement a set of services in the erasable programmable read-only memory in an embedded platform in the appliance, wherein the set of services is applications that perform the functions of the appliance, wherein a set of security mitigation features in the appliance is applied to the set of services, and wherein the set of security mitigation features include security policies that are applied to the set of services in the appliance,
  - to receive a modification to at least one of the operating system and the set of services through one or more secure interfaces wherein the modification is a software change in the appliance and includes an encryption technique during the software change between a source of the software change and the appliance, and
  - to provide the set of services from the appliance to a set of registered devices wherein the set of registered devices is a registry of devices created by an administrator and the registry identifies devices that can interact together in a secure environment,
- wherein the appliance does not include a hard drive, an external storage, a CDROM device, nor a floppy disk device.

21. The system of claim 20, wherein the appliance is operable to receive a set of information associated with a list of registered devices that are allowed to interact with the appliance, and wherein the set of information comprises a master list of the registered devices allowed to communicate with the appliance that is created in a secure environment and periodically sent to the appliance to identify the registered devices that are allowed to interact with the appliance.

22. A system for implementing a secure network for IP telephony services, comprising:
- one or more computing devices operating in a packet network associated with a VOP call;
- the one or more computing devices operable to at least one of communicate with each other and communicate with a set of registered devices wherein the set of registered devices is a registry of devices created by an administrator and the registry identifies devices that can interact together in a secure environment; and
- the one or more computing devices operable to provide an operating system with a restricted access wherein the operating system is embedded in an erasable programmable read-only memory in a processor, to implement a set of services in the erasable programmable read-only memory in an embedded platform in the appliance, wherein the set of services is applications that perform the functions of the appliance, wherein a set of security mitigation features in the appliance is applied to the set of services, and wherein the set of security mitigation features include security policies that are applied to the set of services in the appliance, to receive a modification to at least one of the operating system and the set of services through one or more secure interfaces wherein the modification is a software change in the appliance and includes an encryption technique during the software change between a source of the software change and the appliance, and to provide the set of services to the set of registered devices,
- wherein the one or more computing devices do not include a hard drive, an external storage, a CDROM device, nor a floppy disk device.

23. The system of claim 22, wherein the one or more computing devices receive a set of information associated with a list of the set of registered devices that are allowed to interact with the one or more computing devices.

24. The system of claim 23, wherein the set of information comprises a master list of the registered devices allowed to communicate with the one or more computing devices wherein the master list is created in a secure environment and periodically sent to the one or more computing devices to identify the registered devices that are allowed to interact with the one or more computing devices.

* * * * *